2,809,503

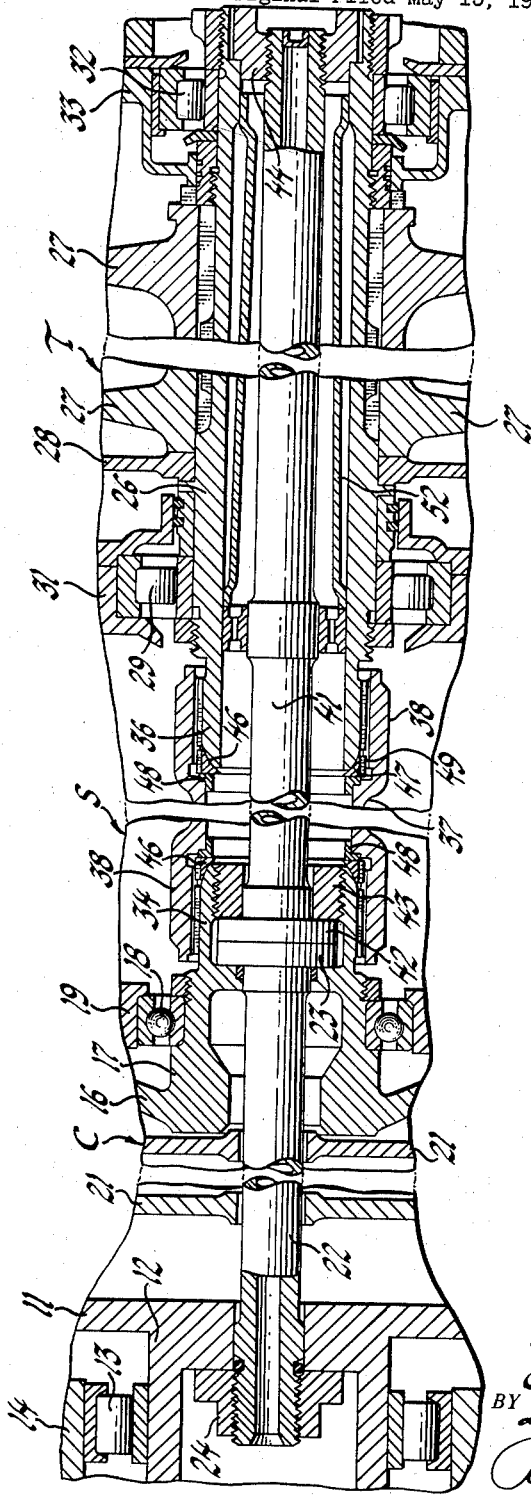

GAS TURBINE SHAFT

Arthur W. Gaubatz, Otakar P. Prachar, John B. Wheatley, and Donald G. Zimmerman, Indianapolis, Ind., assignors to General Motors Corporation, Detroit, Mich., a corporation of Delaware Original application May 15, 1950, Serial No. 162,068, now Patent No. 2,791,091, dated May 7, 1957. Divided and this application June 25, 1956, Serial No. 593,428

5 Claims. (Cl. 64—1)

Our invention relates to shafting and particularly to a shafting arrangement suitable for interconnecting the turbine and compressor of a gas turbine engine. The shaft arrangement is adapted to transmit torque between the turbine and compressor, to transmit an axial or end thrust load between the two, and to accommodate minor misalignments of the compressor and turbine shafts such as may occur in service in such an engine.

This application is a division of our application Serial No. 162,068 for Power Plant Cooling and Thrust Balancing Systems, filed May 15, 1950 (now Patent No. 2,791,091 issued May 7, 1957). A power plant in which the invention is employed is described in some detail in the said application, the claims of which are directed to thrust balancing and cooling features of the engine.

To avoid prolixity, structure of the engine not material to an understanding of the shaft arrangement of this invention is omitted from the drawing and specification of this application. Reference may be made to the said parent application for further details of structure of the engine. Reference may also be made to U. S. Patents Nos. 2,675,174 and 2,693,248 for disclosure of related features of the engine.

The principal objects of the invention are to provide an improved gas turbine, to provide a shafting arrangement specially suitable for gas turbine engines, and to provide a shaft arrangement capable of carrying relatively heavy torque and thrust loads but which has a limited degree of angular flexibility to accommodate wracking or distortion of the engine which may occur in operation.

The nature of the invention and the advantages thereof will be clearly apparent to those skilled in the art from the following specification and the accompanying drawing, which is a fragmentary sectional view of a gas turbine engine taken on a plane containing the axis of the principal rotating parts of the engine.

Referring to the drawing, the engine comprises a compressor C, a turbine T, and a connecting shaft S which transmits power from the turbine to the compressor. The compressor and turbine stators and the frame of the engine in general are not illustrated except that the supports for the rotor bearings are shown fragmentarily. The compressor rotor comprises a forward wheel or disk 11 integral with a stub shaft 12 mounted in a roller bearing 13 supported in a portion 14 of the engine frame. The compressor rotor also includes a rear wheel or disk 16 integral with hollow stub shaft 17 supported in ball thrust bearing 18 mounted in a portion 19 of the engine frame. A number of additional disks 21, of which two are shown, are mounted between the end disks 11 and 16. The compressor structure may be as illustrated in Patent 2,675,174, in which the rims of the disks 11, 16, and 21 are in abutting engagement. The disks of the compressor are held assembled by a tie bolt 22 having a head 23 abutting the rear face of an internal flange on stub shaft 17 and having a nut 24 threaded on the front end thereof abutting the forward face of front disk 11.

The turbine rotor comprises a hollow shaft 26 on which are mounted a number of turbine wheels 27 and a labyrinth seal disk 28. Shaft 26 is supported at its forward end in a roller bearing 29 mounted in a portion 31 of the engine frame and at its rear end in a roller bearing 32 mounted in a portion 33 of the engine frame.

A rearward extension 34 of stub shaft 17 and a forward extension 36 of the turbine shaft constitute parts of coupling means by which these shafts are coupled to the connecting shaft S. The connecting shaft S constitutes a tubular central portion 37, the major part of which is broken away in the drawing, and end portions or end bells 38 which are internally splined and cooperate with external splines on the shaft extensions 34 and 36 for transmission of torque from the turbine to the compressor. The splines are sufficiently loose to permit small lateral or angular misalignments of the shafts 17 and 26.

The compressor and turbine rotors are also connected for transmission of end thrust between these two shafts by a tie bolt 41 which pulls rearwardly on the compressor shaft and forwardly on the turbine shaft. The tie bolt has a head 42 at the forward end thereof which is mounted in the extension 34 in juxtaposition to the head 23 of the compressor tie bolt and is held there by a threaded ring 43 threaded into the end of the shaft extension 34. The rear end of tie bolt 41 is threaded to receive a nut 44 which pilots within the hollow turbine shaft 26 and bears against the end of the shaft.

The coupling means between the connecting shaft and the other two shafts comprise also means to withstand the pull of the tie bolt, particularly when the engine is not operating. These structures are the same at both connections and, therefore, will be described only at the connection between the turbine shaft and the connecting shaft. The forward end of the turbine shaft is formed with a convex spherical surface 46 which bears against a complementary concave spherical surface of a thrust ring 47. The forward face of the thrust ring is radial and bears against a radial surface of a bearing ring 48 mounted in the rear end of the connecting shaft. Splines 49 on the periphery of the thrust ring are in engagement with the internal splines on the connecting shaft so that it is constrained to rotate with the connecting shaft. These splines permit some radial motion of the thrust ring in the event of misalignment of the connecting shaft and the turbine shaft. A similar thrust ring 46 and bearing ring 48 are provided at the coupling between the connecting shaft and the compressor stub shaft.

When the engine is not operating, the pull of the tie bolt is taken by the thrust rings 46. When the rearward thrust load on the turbine in operation becomes greater than the preload of the tie bolt, the pressure on the thrust rings 46 is relieved.

A sleeve 52 is mounted within the turbine shaft 26 between the shaft and the tie bolt. It will be noted that the compressor tie bolt 22 and turbine tie bolt 41 are hollow. As described in U. S. Patent 2,693,248, these tie bolts may serve as a conduit to carry oil to the shaft bearings, but, since this is not material to the present invention, it will not be described.

It will be apparent to those skilled in the art from the foregoing that the shaft structure of the invention is particularly well adapted to provide the necessary degree of flexibility in the connection between the turbine and compressor and to transmit the torque and thrust loads of the engine, and that the structure thereof is simple and rugged and is adapted to easy assembly. In the assembly of the engine, the turbine tie bolt may be mounted in the compressor stub shaft by means of nut 43. The coupling shaft S is then slid over the tie bolt and over the end portion 34 of the compressor stub shaft. When the turbine is assembled onto the engine, the hollow turbine shaft is slid over the tie bolt until its end portion engages the thrust ring 46, and the assembly is completed by fitting and tightening the nut 44.

The detailed description of the invention for the purposes of explaining the principles thereof is not to be construed as limiting or restricting the invention, as many modifications may be made by the exercise of skill in the art without departing from the principles thereof.

We claim:

1. A gas turbine power plant comprising, in combination, a first rotor shaft; a second rotor shaft; a connecting shaft connecting the first and second shafts; and coupling means between the connecting shaft and the other said shafts, one coupling means comprising an external spline on one shaft, an internal spline on the other shaft, the splines being in torque transmitting engagement, means defining a spherical surface on one shaft concentric therewith, means defining a radial surface on the other shaft, the said surfaces facing each other, a thrust ring disposed between and engaging the said surfaces, and means positively coupling the thrust ring to one of the shafts for rotation therewith.

2. A power plant comprising, in combination, a first rotor shaft; a second rotor shaft; a connecting shaft connecting the first and second shafts; coupling means between the connecting shaft and the other said shafts, one coupling means comprising an external spline on one shaft, an internal spline on the other shaft, the splines being in torque transmitting engagement, means defining a spherical surface on one shaft concentric therewith, means defining a radial surface on the other shaft, the said surfaces facing each other, a thrust ring disposed between and engaging the said surfaces, and means positively coupling the thrust ring to one of the shafts for rotation therewith; and a tie bolt extending through the connecting shaft and connected to the first and second shafts.

3. A power plant comprising, in combination, a first rotor shaft; a second rotor shaft; a connecting shaft connecting the first and second shafts; coupling means between the connecting shaft and the other said shafts, each coupling means comprising an external spline on one shaft, an internal spline on the other shaft, the splines being in torque transmitting engagement, means defining a spherical surface on one shaft concentric therewith, means defining a radial surface on the other shaft, the said surfaces facing each other, a thrust ring disposed between and engaging the said surfaces, and means positively coupling the thrust ring to one of the shafts for rotation therewith; and a tie bolt extending through the connecting shaft and connected to the first and second shafts.

4. A gas turbine power plant comprising, in combination, a first rotor shaft; a second rotor shaft; a connecting shaft connecting the first and second shafts; coupling means between the connecting shaft and the other said shafts, one coupling means comprising external splines on the rotor shaft, internal splines on the connecting shaft, the splines being in torque transmitting engagement, means defining a spherical surface on the rotor shaft concentric therewith, means defining a radial surface on the connecting shaft, the said surfaces facing each other, a thrust ring disposed between and engaging the said surfaces, and splines on the thrust ring positively coupling the thrust ring to the splines on the coupling shaft for rotation therewith; and a tie bolt extending through the connecting shaft and connected to the first and second rotor shafts.

5. A gas turbine power plant comprising, in combination, a first rotor shaft; a second rotor shaft; a connecting shaft connecting the first and second shafts; coupling means between the connecting shaft and the other said shafts, one coupling means comprising an external spline on one shaft, an internal spline on the other shaft, the splines being in torque transmitting engagement, means defining a convex spherical surface on one shaft concentric therewith, means defining a concave spherical surface on the other shaft, the said surfaces engaging each other; and a tie bolt extending through the connecting shaft and connected to the first and second shafts.

References Cited in the file of this patent

UNITED STATES PATENTS

| | | |
|---|---|---|
| 2,655,014 | Walker | Oct. 13, 1953 |
| 2,778,565 | Atkinson | Jan. 22, 1957 |

FOREIGN PATENTS

| | | |
|---|---|---|
| 156,649 | Australia | May 21, 1954 |
| 630,919 | Great Britain | Oct. 24, 1949 |